April 21, 1953 — W. A. WOOD — 2,635,545
DUAL PUMP
Filed Aug. 19, 1948 — 3 Sheets-Sheet 1
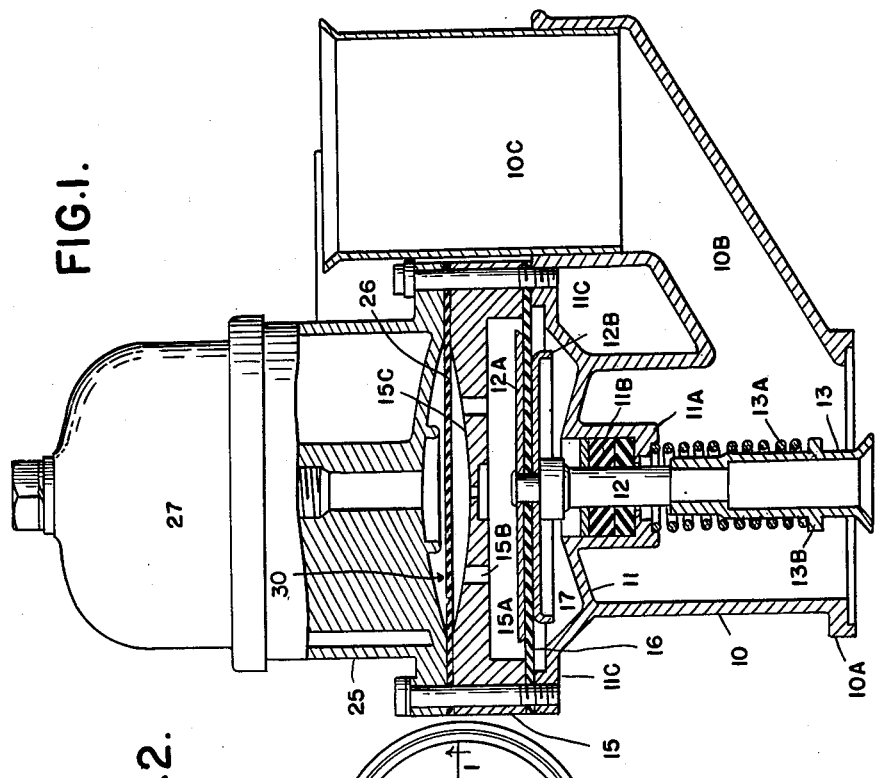
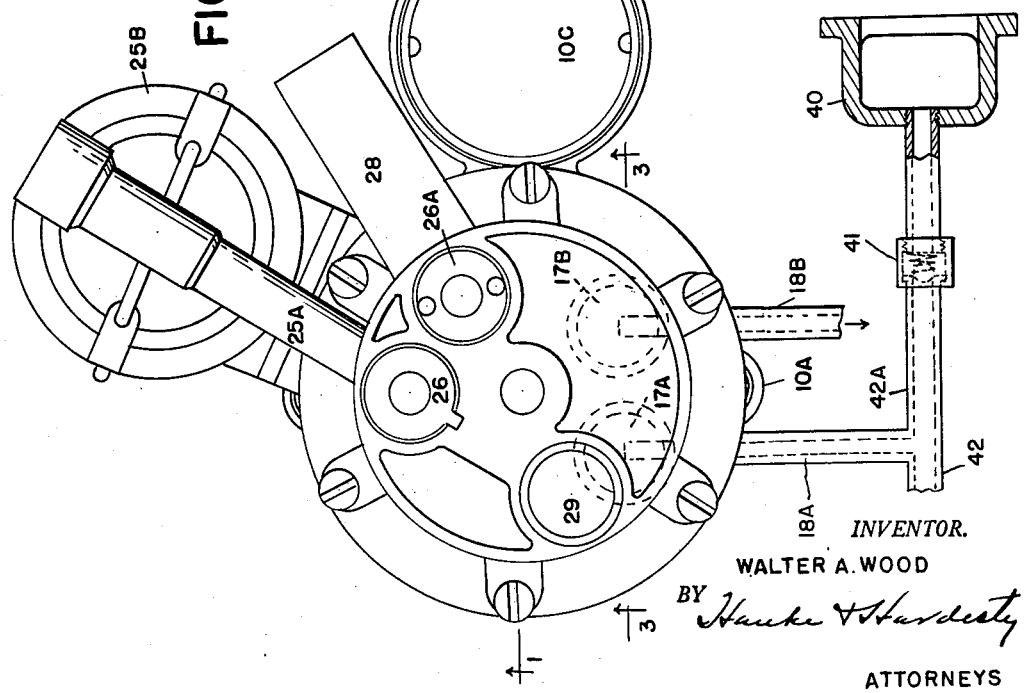
INVENTOR.
WALTER A. WOOD
BY Hauke & Hardesty
ATTORNEYS

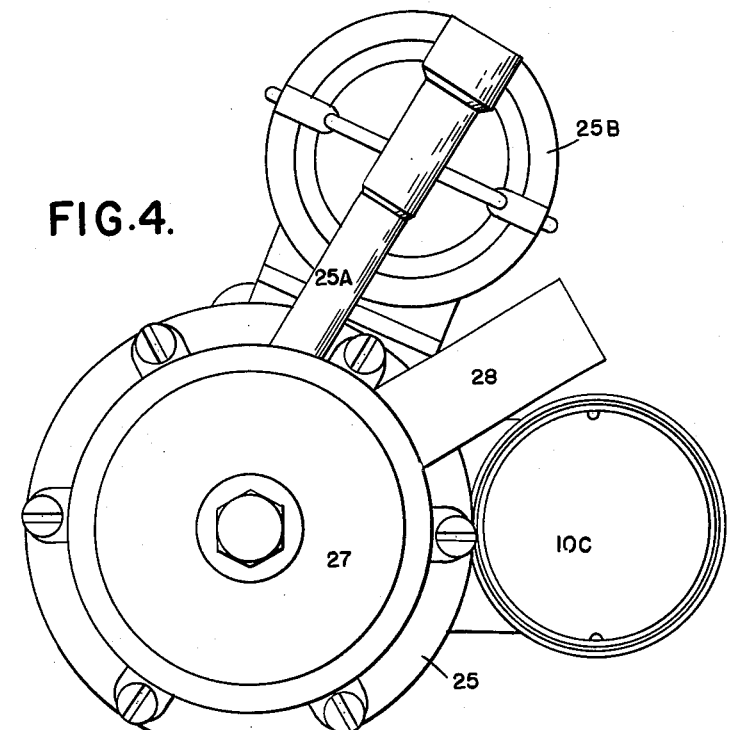
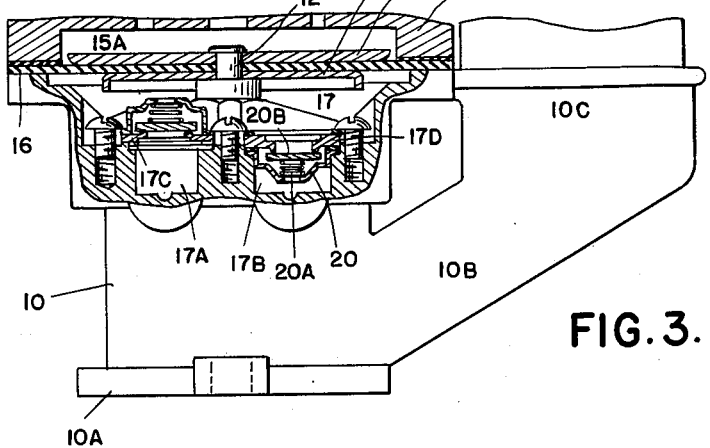

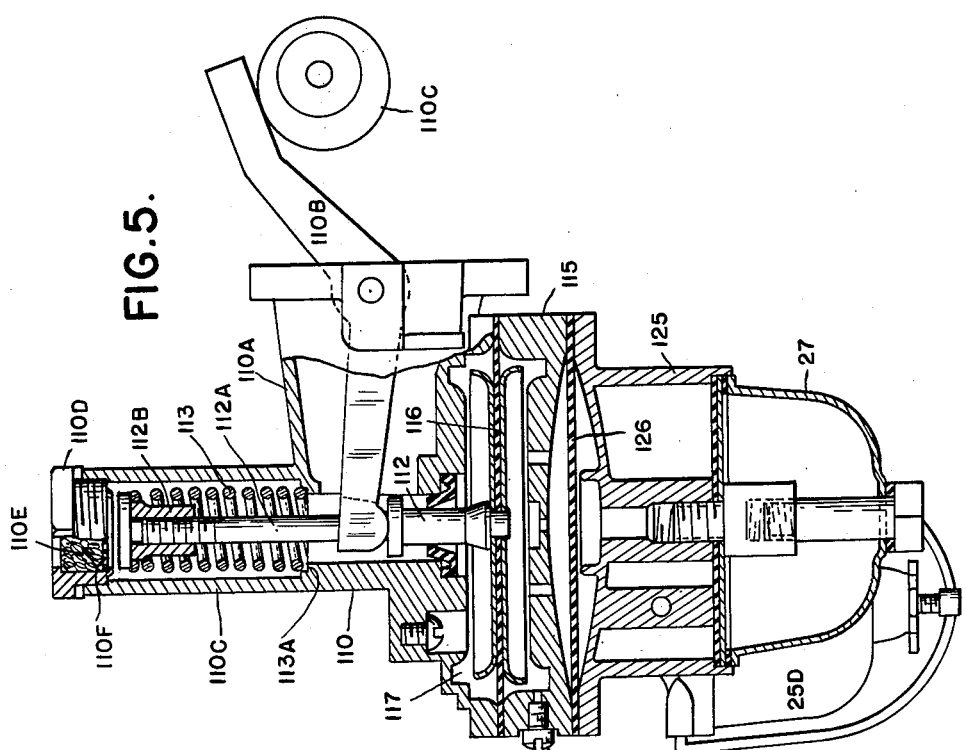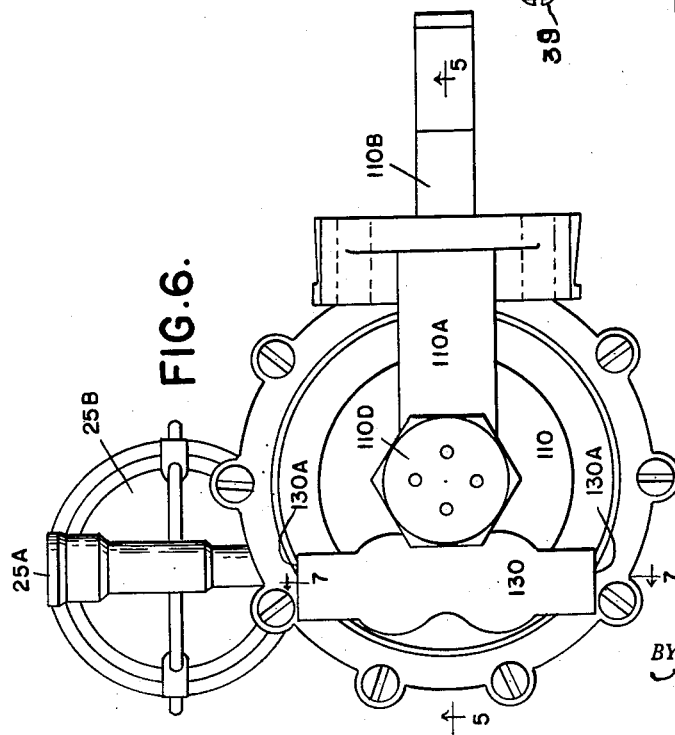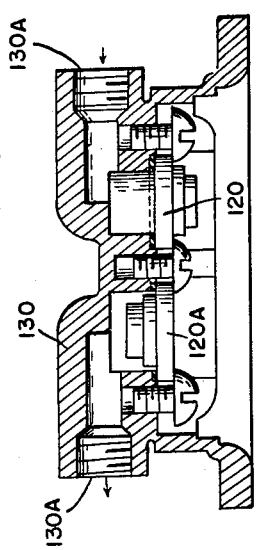

Patented Apr. 21, 1953

2,635,545

UNITED STATES PATENT OFFICE 2,635,545

DUAL PUMP

Walter A. Wood, Oak Park, Ill.

Application August 19, 1948, Serial No. 45,095

3 Claims. (Cl. 103—4)

1

The present invention relates to combination fuel and vacuum pumps for installation on automotive power plants and has among its objects a combination pump that will transfer liquid fuel from the fuel tank to the carburetor of such a plant and also act as a vacuum booster for the conventional windshield wiper.

As all drivers of automotive vehicles equipped with intake vacuum operated windshield wipers know, there are certain conditions under which such wipers either do not operate at all or operate so slowly as to be ineffective, and such conditions obtain frequently at times when clear vision for the driver is imperative. For example, when the engine is being operated at full throttle on a long uphill pull in a rain or snow storm, the intake vacuum is usually so little that the wiper is ineffective to provide clear vision. Or, when making a start from idling if the throttle is suddenly opened, the wiper will either stop or slow to a point of ineffectiveness.

The obviation of such difficulties by providing means to produce the vacuum necessary to carry on the wiper operation when the intake vacuum is low is, therefore, an object of the present invention.

Another object is the modification of the fuel pump structure such as has been disclosed in U. S. Patent #2,289,617, issued July 14, 1942, to the present inventor, particularly Fig. 3, thereof, so as to provide both a fuel and a vacuum pump economically by using both sides of the full stroke diaphragm.

Other objects and advantages will be apparent to those skilled in the art upon reference to the following description and the accompanying drawings in which:

Fig. 1 is a section of the combined pump as if on line 1—1 of Fig. 2.

Fig. 2 is a top plan view with certain parts omitted.

Fig. 3 is a section of the air pump valve chamber on line 3—3 of Fig. 2.

Fig. 4 is a top plan view of the pump.

Fig. 5 is a vertical section of another form of pump as if on line 5—5 of Fig. 6.

Fig. 6 is a top plan view of the pump of Fig. 5.

Fig. 7 is a section of the air pump valve chamber on line 7—7 of Fig. 6.

As shown in the drawings, particularly Figs. 1 to 4, one form of the dual pump consists of a bottom member 10 provided with a suitable flange portion 10A by means of which it is secured to the engine over a suitable opening therein. The member 10 is shown as having a laterally arranged conduit 10B connected to the upwardly opening oil filler 10C through which lubricating oil may be introduced into the engine.

The member 10 comprises a vertically arranged cylindrical portion above the flange 10A, closed at its upper end by a wall 11 having a centralized opening surrounded by a suitable cup 11A adapted to receive packing material 11B serving to pack and lubricate a short shaft or stem 12 passing through the opening.

The lower end of stem 12 is shown as reduced and fixed into the upper end of a thimble 13. This thimble 13 is adapted to receive the upper end of a suitable pushrod (not shown) cam actuated to reciprocate the thimble and stem in one direction, the return stroke being accomplished by a spring 13A surrounding the thimble 13 and acting between the flange 13B, carried by the thimble, and the bottom of cup 11A.

As shown in Fig. 1, the member 10 extends a short distance above the wall 11 and is flared, this flared wall terminating in a flange 11C. Mounted on the flange 11C is an intermediate member 15 and between this and the flange is a flexible diaphragm 16, the latter being fixed at its center to the stem 12. Stem 12 is shown as riveted to a pair of plates 12A and 12B lying on the upper and lower faces respectively of the diaphragm 16. These plates 12A and 12B serve to fix the stem to the diaphragm and also to control the action of the latter and limit the flexing to the outer portion thereof.

The diaphragm 16 and the flared upper end of the member 10 provide a pump chamber 17 under the diaphragm and opening to said chamber to one side of the center thereof is a pair of valve chambers 17A and 17B (see Fig. 3) from which extend small conduits 18A and 18B.

Over the chambers 17A and 17B are secured valve seat plates 17C and 17D, the former 17C having its seat portion arranged on top, that is, inwardly of chamber 17, and the latter 17D having its seat portion arranged inwardly of chamber 17B.

Over the plates 17C and 17D are fixed the fuel valve members each consisting of a thimble 20 open at both ends and enclosing a spring 20A and a disc valve 20B. These fuel valve assemblies will of course be fixed over their respective seat plates so that the one over plate 17C opens toward chamber 17 and the one over plate 17D opens toward chamber 17B.

The intermediate member 15 is, as shown, cut away at its underside to provide room for movement of the diaphragm 16 and to provide a pulsating chambebr 15A, and is likewise provided with passages 15B leading to its upper surface which is dished as shown at 15C.

Fixed upon the upper face of member 15 is the fuel pump body 25 and between these members is clamped the flexible diaphragm 26 sealing the pulsating chamber 15A. The latter, of course, includes the space at the upper side of member 15. Leading into the body 25 is the fuel intake 25A, the fuel passing first through the conventional settling chamber 25B.

This intake conduit is controlled by a fuel valve 26 of substantially the same construction as the valves above described and opens into the pumping chamber 30. At 26A is a similar valve controlling the outflow of fuel through conduit 28. At 29 is shown the opening leading to bypass means which under certain conditions allows back flow of fuel to the inlet conduit.

Since the exact construction of the fuel pump is not of great importance, it is not being described in detail except that it is of the kind illustrated in the above mentioned patent and is actuated by the diaphragm 26 and this in turn is actuated by the pulsation of air in the chamber 15A due to movement of diaphragm 16.

Diaphragm 16 is a common element of both the fuel and air (or vacuum) pumps.

In the operation of the dual pump, the fuel conduits 25A and 28 will be connected to the tank and carburetor respectively, and the conduit 18A connected to the conduit 42 leading from the engine manifold 40 to the windshield wiper (not shown). The conduit 18B may open to the engine crankcase or to the atmosphere, preferably the crankcase. Further, a spring actuated one way air valve 41 is placed in the conduit 42 between conduit 18A and manifold 40. With this arrangement, and using light springs in the fuel valves, whenever it is desired to operate the windshield wiper and the intake vacuum is high, air will be drawn through the conduit 42 and air valve 41 by-passing the pump. However, when the intake vacuum drops, due to throttle opening, the air valve 41 will close and the pump will operate to produce the vacuum required to operate the wiper, since the diaphragm 16 is actuated at full stroke whenever the motor is running.

In Figs. 5 to 7, the dual pump is substantially the same as that of the preceding figures except that the positions of the two pumps is reversed to put the fuel pump below and the air pump above. This form of the dual pump consists of three body potrions or members as does the other form. The upper member 110 is provided with a flanged lateral extension 110A by means of which the pump may be mounted on the side of the engine crankcase (not shown) and within which is pivotally mounted a rocker arm 110B one end of which coacts with a cam 110C carried upon a suitable rotating shaft forming part of the engine mechanism.

At its other end, the rocker arm 110B coacts with the stem 112, the end of the rocker arm being forked and contacting stem 112 on either side of an upwardly extending rod portion 112A. At the upper end of rod 112A is fixed a cap 112B and acting between the cap and a suitable shoulder 113A in the upward extension 110C of member 110 is a suitable spring 113. The extension 110C is preferably closed at its upper end by a suitable screw plug 110D, enclosing a filter 110E held between the perforated upper end of the cap and a suitable screen 110F.

The diaphragm 116, to which the stem 112 is fixed, is clamped between the member 110 and an intermediate member 115, of substantially the form of member 115, and between this member 115 and the pump body member 125 is clamped the fuel pumping diaphragm 126.

The construction and operation of the fuel pump portion of the device is substantially the same as that described in connection with Figs. 1 to 4.

As shown in Figs. 6 and 7, the member 110 carries a valve chest 130 opening to the chamber 117 formed by the under surface of member 110 and diaphragm 116. This valve chest is provided with valves 120 and 120A, the former being the inlet valve and the latter the outlet valve. These valves are of substantially the same construction as the valves 20 of Fig. 3, and the conduits which they control are fixed to the connections 130A.

The dual pump of Figs. 5 to 7 will be connected to the fuel lines and suction line between the intake manifold and the windshield wiper in the same fashion as has been described in Figs. 1 to 4, and will operate in like manner.

As set out in the above mentioned patent, both forms of the dual pump will include a controlled vent to the chamber between the diaphragms on the fuel pumping side. This vent is indicated in Fig. 5 by the screw 39, but, since it is not being claimed therein, detailed description is thought unnecessary.

Now having described the invention and the preferred embodiment thereof, it is to be understood that said invention is to be limited, not to the specific details herein set forth, but only by the scope of the claims which follow:

I claim:

1. A combined fuel and air pump comprising a fuel pump body member, a hollow intermediate member and an air pump body member, a diaphragm fixed between the first body member and the intermediate member, a second diaphragm fixed between the intermediate member and the air pump body member, said diaphragms sealing the space within said intermediate member, fuel flow controlling valves in said fuel pump body member, air flow control valves in said air pump body member, and means adapted continuously and positively to oscillate said second diaphragm through its full range.

2. A combination fuel and air pump including an oscillatable diaphragm, means for positively actuating said diaphragm, said means consisting of a rotatable cam and a rigid member extending from said cam to said diaphragm and adapted to move the latter a full stroke in one direction for each revolution of said cam and spring return means for moving said diaphragm in the other direction, means providing an air pump chamber on one side of said diaphragm including an air inlet valve and an air outlet valve, means including a second diaphragm providing a closed air filled chamber on the other side of the first diaphragm, and a fuel pump of which said second diaphragm is an element actuable by the alternate compression and depression of the air in said closed chamber due to the oscillation of the first diaphragm.

3. A combination fuel and air pump including an oscillatable element, means for positively actuating said element, said means consisting of a rotatable cam and a rigid member extending from said cam to said element and adapted to move the latter a full stroke in one direction for each revolution of said cam and spring return means for moving said element in the other direction, means providing an air pump chamber on one side of said element including an air inlet valve and an air outlet valve, means providing a closed air filled chamber on the other side of said element, the latter means including a second oscillatable element, and a fuel pump, of which said second oscillatable element is a part, actuable by the alternate compression and depression of the air in said closed chamber due to the movement of the first oscillatable element.

WALTER A. WOOD.

References Cited in the file of this patent

UNITED STATES PATENTS

| Number | Name | Date |
|---|---|---|
| 1,694,279 | Oishei | Dec. 4, 1928 |
| 1,840,527 | Rabezzana | Jan. 12, 1932 |
| 1,883,459 | Avigdor | Oct. 18, 1932 |
| 1,982,966 | Schweisthal | Dec. 4, 1934 |
| 2,018,153 | Schulze | Oct. 22, 1935 |
| 2,289,617 | Wood | July 14, 1942 |
| 2,289,651 | Horton | July 14, 1942 |